US012571882B2

(12) United States Patent
Ferenets et al.

(10) Patent No.: US 12,571,882 B2
(45) Date of Patent: Mar. 10, 2026

(54) METHOD, SYSTEM AND DEVICE FOR ANALYZING PEDESTRIAN MOTION PATTERNS

(71) Applicant: STARSHIP TECHNOLOGIES OÜ, Tallinn (EE)

(72) Inventors: Rain Ferenets, Tallinn (EE); Tanel Pärnamaa, Tallinn (EE); Sten Sootla, Tallinn (EE); Tõnis Saar, Tallinn (EE); Ahti Heinla, Ravila (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 451 days.

(21) Appl. No.: 17/798,600

(22) PCT Filed: Feb. 24, 2021

(86) PCT No.: PCT/EP2021/054591
§ 371 (c)(1),
(2) Date: Aug. 10, 2022

(87) PCT Pub. No.: WO2021/175682
PCT Pub. Date: Sep. 10, 2021

(65) Prior Publication Data
US 2023/0117848 A1      Apr. 20, 2023

(30) Foreign Application Priority Data

Mar. 2, 2020    (EP) ..................................... 20160440

(51) Int. Cl.
*G01S 7/41*          (2006.01)
*G01S 13/86*        (2006.01)
(Continued)

(52) U.S. Cl.
CPC ............ *G01S 7/415* (2013.01); *G01S 13/862* (2013.01); *G01S 13/931* (2013.01);
(Continued)

(58) Field of Classification Search
CPC ...... G01S 7/415; G01S 13/862; G01S 13/931; G01S 2013/93271; G01S 7/417;
(Continued)

(56) References Cited

U.S. PATENT DOCUMENTS 4,549,841 A    10/1985  Ishige
5,664,928 A     9/1997  Stauber
(Continued)

FOREIGN PATENT DOCUMENTS

DE      102019123783 A1 *    3/2021    ........... G05D 1/0214
JP         2009151382 A  *    7/2009
(Continued)

OTHER PUBLICATIONS

H. zhang, Y. Ge and W. Li, "Human Following of Mobile Robot With a Low-cost Laser Scanner," 2019 IEEE International Conference on Systems, Man and Cybernetics (SMC), Bari, Italy, 2019, pp. 3987-3992, doi: 0.1109/SMC.2019.8914440. (Year: 2019).*
(Continued)

*Primary Examiner* — Ladimir Magloire
*Assistant Examiner* — Remash R Guyah
(74) *Attorney, Agent, or Firm* — Siritzky Law, PLLC

(57)                    ABSTRACT
A method, system, and device for mobile robot operations. The method comprises a mobile robot comprising at least one sensor configured to capture data related to the robot's surroundings traveling on a pedestrian pathway. The method also comprises the mobile robot using the sensor to collect data relating to moving objects in the robot's surroundings. The method further comprises detecting at least one pedestrian within the collected data, said pedestrian moving with a motion pattern. The method also comprises analyzing the pedestrian's motion pattern to determine and output the pedestrian's intent. The system comprises at least one mobile robot configured to travel on pedestrian pathways.
(Continued)

Approach a pedestrian crossing

Moving objects detected?

If yes — Pedestrians with motion pattern detected?    Analyze road crossing further — If not If yes — Analyze motion pattern Motion pattern indicates intent to cross?  ◄ ►  Motion pattern does not indicate intent to cross?

Input into road crossing module

Input other data into road crossing module

Decide whether mobile robot will cross the road

The robot comprises at least one sensor configured to capture data related to the robot's surroundings and to collect data relating to moving objects in said surroundings. The system also comprises at least one pedestrian detector. The pedestrian detector is configured to process the sensor data to at least detect a pedestrian moving with a motion pattern. It is also configured to analyze the pedestrian's motion pattern and determine and output the pedestrian's intent. The robot comprises at least one sensor configured to capture data related to the robot's surroundings and to collect data relating to moving objects in said surroundings. The robot also comprises at least one processing component configured to process the sensor data to at least detect a pedestrian moving with a motion pattern, and analyze the pedestrian's motion pattern, and determine and output the pedestrian's intent.

18 Claims, 5 Drawing Sheets

(51) Int. Cl.
    *G01S 13/931*        (2020.01)
    *G05D 1/00*          (2024.01)
(52) U.S. Cl.
    CPC ......... *G05D 1/0214* (2013.01); *G05D 1/0255*
        (2013.01); *G05D 1/0257* (2013.01); *G01S*
                              *2013/93271* (2020.01)
(58) Field of Classification Search
    CPC ...... G01S 7/539; G01S 13/865; G01S 13/867;
            G01S 15/931; G01S 2013/9323; G01S
            2013/9324; G01S 2013/93274; G01S
            13/89; G01S 13/86; G01S 13/863; G01S
            7/41; G05D 1/0214; G05D 1/0255; G05D
            1/0257; G05D 1/0088; G05D 1/0223;
            G05D 1/227; G05D 1/617; G05D 1/65;
            G05D 1/0246; G05D 1/247; G05D 1/249;
            G05D 1/02; G05D 1/021; G05D 1/023;
            G05D 2201/0213; G08G 1/166; G08G
            1/0104; G08G 1/161; G08G 1/005; B25J
            5/00; B25J 5/007; B25J 11/0005; B25J
                        11/008; B25J 11/0085
    USPC ........ 342/70, 27, 28, 52, 53, 54, 55, 71, 72,
            342/104, 105, 106, 107, 108, 109, 113,
            342/114, 115, 146, 147, 454, 455, 456,
            342/457; 701/23, 501, 25, 26, 28, 301,
            701/408, 409, 410, 445, 447, 468, 469,
            701/340, 901, 903, 904, 905, 934, 935,
            701/436, 437, 180, 167, 168, 169, 170,
                                            701/171
    See application file for complete search history.

(56)                References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 9,904,859 | B2 | 2/2018 | Grauer |
| 10,282,995 | B2 | 5/2019 | Heinla et al. |
| 10,338,591 | B2 | 7/2019 | Baalke et al. |
| 2003/0165373 | A1 | 9/2003 | Felder et al. |
| 2005/0207876 | A1 | 9/2005 | Springwater |
| 2006/0237239 | A1 | 10/2006 | Bruner et al. |
| 2009/0043440 | A1* | 2/2009 | Matsukawa ......... G05D 1/0214 |
| | | | 701/25 |
| 2012/0090110 | A1 | 4/2012 | Van Den Berg et al. |
| 2012/0101632 | A1 | 4/2012 | Ha et al. |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Barragan Trevino et al. |
| 2015/0183581 | A1 | 7/2015 | Worsley |
| 2015/0379468 | A1 | 12/2015 | Harvey |
| 2016/0185466 | A1 | 6/2016 | Dreano, Jr. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1* | 1/2017 | Tokuyama ............. G05D 1/024 |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2018/0020896 | A1 | 1/2018 | High et al. |
| 2018/0107217 | A1 | 4/2018 | Asada et al. |
| 2018/0232839 | A1 | 8/2018 | Heinla et al. |
| 2018/0349834 | A1 | 12/2018 | Heinla et al. |
| 2019/0324459 | A1* | 10/2019 | Baalke ................. G05D 1/0246 |
| 2020/0091565 | A1 | 3/2020 | Väin et al. |
| 2020/0272155 | A1* | 8/2020 | Lo ............................ G06N 3/08 |
| 2020/0276710 | A1* | 9/2020 | Hager, IV ............. B25J 9/1664 |

FOREIGN PATENT DOCUMENTS

| | | | | | |
|---|---|---|---|---|---|
| JP | 2010015194 | A | * | 1/2010 | |
| JP | 2012200818 | A | * | 10/2012 | |
| JP | 2019197241 | A | | 11/2019 | |
| KR | 20190078126 | A | * | 7/2019 | ............. B25J 11/00 |
| WO | 2011035839 | A2 | | 3/2011 | |
| WO | 2018215581 | A1 | | 11/2018 | |

OTHER PUBLICATIONS

Zhang, Heng, Yanhong Ge, and Wenfeng Li. âHuman Following of Mobile Robot With a Low-Cost Laser Scanner.â Conference Proceedings—IEEE International Conference on Systems, Man, and Cybernetics. IEEE, 2019. 3987â3992. Web. (Year: 2019).*
Radwan, Noha, Wolfram Burgard, and Abhinav Valada. âMultimodal Interaction-Aware Motion Prediction for Autonomous Street Crossing.â The International journal of robotics research 39.13 (2020): 1567â1598. Web. (Year: 2020).*
EPO, European Examination Report received in European Application No. 21706954.1, May 17, 2024.
Baker: "Automated Street Crossing for Assistive Robots" Proceedings of the 2005 IEEE, Jun. 28-Jul. 1, 2005 http://citeseerx.ist.psu.edu/viewdoc/downloaddoi=10.1.1.124.2156 rep=rep1 type=pdf.
Noha Radwan et al, "Multimodal Interaction-aware Motion Prediction for Autonomous Street Crossing", arxiv.org, Cornell University

(56) References Cited

OTHER PUBLICATIONS

Library, 201 Olin Library Cornell University Ithaca, NY 14853, XP080898617.

Jeniece Pettitt: "Forget-delivery-drones-meet-your-new-delivery-robot", Nov. 2, 2015; Retrieved from the Internet: URL:https://www.cnbc.com/2015/11/02/forget-delivery-drones-meet-your-new-delivery-robot.html.

Anonymous: "Lieferroboter Starship: "Klauen wurde ich ihn nicht"—Auto—Tagesspiegel", Nov. 29, 2015; and translation Retrieved from the Internet: URL: http://www.tagesspiegel.de/mobil/lieferroboter-starship-klauen-wuerde-ich-ihn-nicht/12647114.html.

WIPO, International Search Report for PCT/EP2021/054591, May 21, 2021.

WIPO, Written Opinion of the International Search Authority for PCT/EP2021/054591, May 21, 2021.

Zhang et al., "Human Following of Mobile Robot With a Low-cost Laser Scanner," 2019 IEEE International Conference on Systems, Man and Cybernetics (SMC), Bari, Italy, 2019, pp. 3987-3992.

Nakamoto et al., "The guidance method of a mobile robot in consideration of human walking characteristics—1st Report: Investigation of human walking characteristics," IECON 2014—40th Annual Conference of the IEEE Industrial Electronics Society, Dallas, TX, USA, 2014, pp. 4067-4073.

* cited by examiner

METHOD, SYSTEM AND DEVICE FOR ANALYZING PEDESTRIAN MOTION PATTERNS

RELATED APPLICATIONS

This application is the National Stage (a 371) of International Application No. PCT/EP2021/054591, filed Feb. 24, 2021, the entire contents of which are hereby fully incorporated herein by reference for all purposes. PCT/EP2021/054591 claims the priority benefit of European patent application 20160440.2, filed Mar. 2, 2020, the entire contents of which are hereby fully incorporated herein by reference for all purposes.

FIELD

The invention relates to mobile robots. More specifically, the invention relates to service robots assisting mobile robots in their operations by analyzing pedestrian motion patterns.

INTRODUCTION

Recently, mobile robots have been used for more and more tasks. The robots are frequently used both in indoor and outdoor settings. Some such robots are configured to navigate on sidewalks and other pedestrian pathways.

US patent application 2018/0232839 A1 filed by the present applicant describes an embodiment of such mobile robots navigating on sidewalks and delivering items.

A mobile robot adapted to travel on sidewalks may occasionally need to cross traffic roads. It can do so using crosswalks, which are generally intended for pedestrian use. To cross the road, the mobile robot may use many inputs such as remote control from an operator terminal, historical and sensor data relating to the road or the like. Some such techniques are addressed in the prior art.

U.S. Pat. No. 10,282,995 filed by the applicant discloses a collision avoidance method and system for a mobile robot crossing a road. When a mobile robot approaches a road, it senses road conditions via at least one first sensor, and initiates road crossing if the road conditions are deemed suitable for crossing. As it crosses the road, the mobile robot senses, via at least one second sensor, a change in the road conditions indicating the presence of at least one hazardous moving object. In response to determining that at least one hazardous object in present, the mobile robot initiates a collision avoidance maneuver. A mobile robot configured to avoid collisions while crossing a road includes: at least one first sensor configured to sense road conditions, at least one second sensor configured to sense road conditions, and a processing component configured to carry out one or more collision avoidance maneuvers.

International patent application WO 2019/224161 A1 filed by the applicant describes a method comprising a data processing device determining whether a mobile robot road crossing is performed automatically and autonomously by the mobile robot or operator-based. The present invention also relates to a method comprising indicating that the mobile robot will cross a road. The present invention also relates to corresponding mobile robots, systems and uses.

US patent application 2012/0101632 A1 discloses a crosswalk walking assistance system to assist a pedestrian by moving a movable robot along with the pedestrian along a boundary of a crosswalk when the pedestrian crosses at the crosswalk, and a method of controlling the same. The crosswalk walking assistance system includes guide rails formed along boundary lines of a crosswalk, robots moving along the guide rails, and a controller connected to the guide rails.

US patent application 2017/0017237 A1 describes an environment information acquisition unit that acquires a signal state of a traffic light. A self-position estimation unit estimates a self-position of the autonomous moving object. A traveling route decision unit calculates a first time necessary to move along a first route from the self-position to an end point of a crosswalk and a second time necessary to move along a second route from the self-point to a start point of the crosswalk in a case in which the signal state is changed from blue to red on the crosswalk after a predetermined time or in a case in which the signal state is changed from blue to red, and selects a route corresponding to a time smaller between the first time and the second time. A vehicle control unit controls autonomous movement of the autonomous moving object so that the autonomous moving object moves along the selected route.

It has been emerging in the art that detecting pedestrians may be helpful with autonomous road crossing by a mobile robot.

For example, U.S. Pat. No. 10,338,591 describes a method for autonomously navigating along a crosswalk that includes: at a first time, navigating autonomously along a sidewalk toward a crosswalk coinciding with a navigation route assigned to the autonomous vehicle; recording optical data of a scene proximal the autonomous vehicle via an optical sensor integrated into the autonomous vehicle; aligning an anteroposterior axis of the autonomous vehicle to the crosswalk detected in the optical data; identifying a pedestrian proximal the crosswalk in the optical data; in response to the pedestrian entering the crosswalk at a second time succeeding the first time, predicting right of way of the autonomous vehicle to enter the crosswalk; and, in response to predicting right of the autonomous vehicle to enter the crosswalk, autonomously navigating from the sidewalk into the crosswalk and autonomously navigating along the crosswalk to an opposing sidewalk according to the navigation route.

SUMMARY

It is the object of the present invention to provide an improved and reliable way for mobile robots to cross traffic roads. It is also the object to present a way of using pedestrian motion patterns as an input into a decision on whether to cross the road.

In a first embodiment, a method for mobile robot operations is disclosed. The method comprises a mobile robot comprising at least one sensor configured to capture data related to the robot's surroundings travelling on a pedestrian pathway. The method also comprises the mobile robot using the sensor to collect data relating to moving objects in the robot's surroundings. The method further comprises detecting at least one pedestrian within the collected data, said pedestrian moving with a motion pattern. The method also comprises analyzing the pedestrian's motion pattern to determine and output the pedestrian's intent.

The present method can advantageously allow the robot to model its behavior on the detected behavior of moving pedestrians. For example, when at a road crossing, pedestrian behavior can be one of the inputs used to decide that the robot may start crossing the road.

The robot's sensor may comprise a plurality of sensors, and its surroundings may be analyzed by data fusion from the many different sensors.

The mobile robot may travel in outdoor surroundings on pedestrian pathways to transport items between destinations, such as e.g. delivering items to item recipients. The pedestrian pathways may refer to sidewalks, crosswalks, gravel roads, or similar paths meant to be used by pedestrians.

The motion pattern of the pedestrian may refer to a predetermined type of motion that can be particularly convenient or easy for the robot to detect. In other words, the motion pattern may refer to a certain sequence of data detected by the robot's sensors that may have previously been determined to correspond to a certain movement that a person tends to perform while moving or walking.

The pedestrian's intent may refer to an intent to continue walking along a certain trajectory, an intent to change the direction of movement or the speed, an intent to cross the road via a crosswalk or the like.

In some embodiments, the method can further comprise the mobile robot approaching a traffic road at a pedestrian crossing. The pedestrian crossing may refer to a crosswalk indicated by a certain marking on the road and/or comprising a pedestrian traffic light. Additionally or alternatively, the pedestrian crossing may not have any particular markings, and may correspond simply to an intersection where a certain traffic road may be crossed (e.g. smaller traffic roads in certain areas may not have particularly marked pedestrian crossings).

In some such embodiments, the method can further comprise using the sensor to collect data on moving objects at and within a predefined region around the road crossing. This can be useful, as the robot may analyze the surroundings of the pedestrian crosswalk in order to determine whether any vehicles are approaching, whether any pedestrians are currently crossing or intending to cross, and/or whether further traffic participants are present (e.g. cyclists, motorized vehicles, animals, children or the like). The predefined region may comprise a certain area including the crosswalk. For example, a region of 10, 20 or 30 meters around the crosswalk may be examiner by the mobile robot to detect moving objects. Additionally or alternatively, the mobile robot may consider the region falling within the field of view of its sensors, which may comprise a region of 50 or 100 meters around the crosswalk.

In some such embodiments, the method can further comprise analyzing the pedestrian's motion pattern to determine and output the pedestrian's intent to cross the traffic road at the road crossing. That is, the pedestrian's distance from the crosswalk may be detected, their speed and direction of motion, any head movements potentially indicating that the pedestrians is looking for incoming traffic vehicles and the like.

In some such embodiments, the method can further comprise using the analysis of the pedestrian's motion pattern as at least one input of a road crossing module, and outputting at least a decision on whether the mobile robot should cross the traffic road. Advantageously, the mobile robot's decision to cross the road may consider that a pedestrian decided to cross/is crossing as one of the inputs. For example, the robot's sensors may be detecting a vehicle in the vicinity of the crossing, but the pedestrian crossing may indicate that the vehicle would stop before the crosswalk. On the other hand, it may not be entirely safe for the robot to entirely rely on the pedestrian crossing the road as the sole input for its own decision. Depending on the pedestrian's speed and position, they may finish the crossing long before the robot, they may be jaywalking or otherwise not following traffic regulations, and/or they may not be paying attention to the road situation. In other words, using the fact the a pedestrian is crossing the road is useful as one of the inputs for the robot's decision making process on whether it should cross the road, but not as a sole input for such decision.

In some embodiments, the at least one sensor can comprise at least one radar sensor. Using the radar sensor to detect moving objects, and particularly identify moving pedestrians can be particularly advantageous. Radars can be less sensitive to lighting conditions, rain, and snow than optical sensors, and may be more accurate in measuring the speed of objects. Therefore, data obtained via radar sensors may be useful in all weather conditions and may provide particularly relevant data related to object speed.

In some such embodiments, the radar sensor can be configured to detect speed of moving objects in its field of view.

In some such embodiments, the radar sensor can be configured to detect distance to objects in its field of view. Detecting distance to the objects together with their speed can allow to obtain an accurate picture of the objects trajectory and to forecast development of a given situation. For example, a Frequency Shift Keying (FSK) radar sensor could be used (one and/or a plurality of such sensors).

In some such embodiments, the radar sensor can comprise at least one imaging radar sensor. The imaging radar sensor can be configured to detect position of objects in its field of view. Additionally to speed of objects and/or distance to them, obtaining the position of the detected objects can be particularly useful to model the environment around the robot and to facilitate its travel and preferably crossing of a road. A combination of radar sensors and one or more imaging radar sensors can be used as well.

In some preferred embodiments, the radar sensor can comprise at least one continuous wave radar. It can also be used in combination with a standard radar sensor and/or further sensors.

In some embodiments, detecting the pedestrian can comprise identifying a moving object detected in the collected data as a moving pedestrian. That is, pedestrian detection may be achieved as part of data processing and/or preprocessing. In other words, the sensor may be used to detect any moving objects in its field of view, which can then be analyzed and determined to be pedestrians or not within a certain confidence range. Furthermore, objects other than pedestrians and/or different types of pedestrians can be identified. For example, pedestrians with children, strollers, with a walking aid, with animals or the like may be identified. Additionally or alternatively, cyclists, vehicles, or the like can also be identified.

In some such embodiments, identifying the moving object as the moving pedestrian can comprise detecting movement of the pedestrian's extremities. In other words, limbs (such as upper and/or lower limbs) of the pedestrian can be identified in the data and the pedestrian detection may be based on such an identification. The motion of extremities or limbs can be modeled based on observations and/or specific assumptions, since it tends to be generally similar and repetitive among a wide range of pedestrians.

In some such embodiments the movement of both upper and lower extremities can be detected and used to identify the moving pedestrian.

In some such embodiments, identifying the moving pedestrian can further comprise detecting at least one extremity of the pedestrian moving with a speed within a predetermined interval. For example, foot movement of about 1-10 meters/s such as about 2-8 meters/s can be associated with a pedestrian walking at a typical pedestrian walking speed.

In some such embodiments, identifying the moving pedestrian can further comprise detecting at least one extremity of the pedestrian moving in a predetermined pattern. For example, movement of one arm/hand and/or leg/foot can be flagged in the detected sensor data as likely corresponding to a moving pedestrian. It can be useful to detect extremities, as the general shape of pedestrians can be modelled, and generally movement of extremities can be pinpointed to a particular region of the detected moving object. For instance, leg motion would be in the lower part of the detected pedestrian, and within a certain distance of the ground plane, which may be separately identified by the robot.

In some embodiments, outputting the pedestrian's intent can comprise outputting an estimated trajectory of the pedestrian. That is, the future likely path of the pedestrian can be estimated based on the identified pedestrian in the sensor's data. For example, the pedestrian's intent to cross a traffic road may be determined based on the estimation of the pedestrian's upcoming trajectory taking them towards the pedestrian crosswalk.

In some embodiments, outputting the pedestrian's intent can comprise outputting a prediction of the pedestrian's future motion. For example, based on certain typical movements or motion pattern, it can be estimated that the pedestrian is likely to stop or accelerate, and/or that they are aiming to cross a road.

In some embodiments, outputting the pedestrian's intent can comprise outputting a prediction of the pedestrian's future action. Such an action may comprise stopping, changing direction of walking, approaching a crosswalk, crossing a traffic road, and/or the like.

In some embodiments, analyzing the motion pattern can comprise processing sensor data taken at a plurality of consecutive time stamps. In other words, the robot may observe the identified pedestrian over a certain time period (such as e.g. 1-5 seconds), and thereby obtain a motion pattern which may be used to model the pedestrian's behavior. In some such embodiments, the method can further comprise extrapolating pedestrian motion based on the detected motion pattern. That is, an estimate of where the pedestrian is heading might be obtained based on the motion pattern.

In some embodiments, analyzing the motion pattern can comprise using a machine learning algorithm. This can comprise a neural network-based approach, such as a convolutional neural network. The inputs may comprise the detected motion pattern (e.g. particular speed, direction of motion, change of velocity, movement of extremities and/or of the pedestrian's head), and the output may comprise the likely intent and/or predicted motion of the pedestrian. The neural network may be trained based on an annotated dataset comprising various detected motion patterns and their significance.

In some embodiments, analyzing the pedestrian's intent can further comprise detecting position of pedestrian in relation to edge of the traffic road. It can further comprise detecting pedestrian movement direction. It can also comprise detecting pedestrian movement speed. It can further comprise detecting pedestrian movement speed variation.

In some embodiments, the sensor can comprise at least one ultrasonic sensor. The ultrasonic sensor can be particularly useful for determining the robot's proximity to moving objects.

In some preferred embodiments, the sensor can comprise at least one ultrasonic and at least one radar sensor, preferably a plurality of ultrasonic and radar sensors. The data obtained by these two types of sensors can be advantageously combined. This data can then be processed by an e.g. neural network (such as a convolutional neural network) to more accurately identify pedestrians in the data.

In some embodiments, the method can further comprise using data related to moving objects collected by at least one ultrasonic and at least one radar sensor for detecting and analyzing moving pedestrians in the robot's surroundings.

In some embodiments, the method can further comprise using at least one further input for the road crossing module. The further input may not be dependent on detected pedestrians' motion patterns. This can be particularly useful, as deciding whether the mobile robot should cross the road is a decision that requires high confidence that it is safe to do so. Using only pedestrian-related input may lead to potentially dangerous situations (e.g. if the pedestrian is jaywalking).

In some such embodiments, the further input can comprise detection of road vehicles approaching the road crossing. That is, if a car is detected approaching the crossing and not sufficiently slowing down, the robot may decide not to cross (it can also optionally emit a warning sound to alert the pedestrian and/or the driver of a possible danger). The further input can also comprise detection of a pedestrian traffic light signal. For example, if the traffic light signal is red (i.e. pedestrians are not authorized to cross at the moment), the robot may decide to not cross the road independently of a pedestrian crossing it). The further input can also comprise detection of other mobile robots approaching the road crossing. Such other robots may have a different field of view for their sensors and thereby be able to make a more informed decision on whether to cross. Additionally or alternatively, it may be preferred to not have multiple robots crossing simultaneously, so detecting another robot may require establishing an order of crossing.

In some such embodiments, the method can further comprise collecting data related to the road crossing with a second sensor, the second sensor being different from the sensor and using the second sensor data as part of the road crossing module. The second sensor can comprise a visual sensor, such as e.g. an image camera and/or a plurality of such cameras. Additionally or alternatively, it can comprise one or more time of flight cameras, lidar sensors, or the like.

In some embodiments, the method can further comprise detecting road vehicles approaching the road crossing and using the detection as another input into the road crossing module.

In some embodiments, the method can further comprise assigning a variable weight to the pedestrian detection based on road crossing conditions. That is, the fact that a pedestrian may be currently crossing and/or approaching a road crossing may be more or less important for the robot's decision to cross or not, based on certain predetermined parameters and/or detected further factors.

The road crossing conditions can comprise one or more of traffic road width, presence of pedestrian traffic light, historic data related to robot crossing the given road crossing, weather, visibility conditions, presence of occluding objects within the robot's field of view of the traffic road, time of the day or day of the week. Any and all of these conditions may influence how much weight the robot would assign to a given pedestrian crossing a given road crossing in order to make own decision to cross or not.

In some embodiments, the decision on whether the mobile robot should cross the road at a given time can be calculated based on the assigned weight of the pedestrian detection and at least one further input.

In some such embodiments, the inputs into the road crossing module can be ranked based on reliability and the detection of a pedestrian crossing the road can be ranked relatively higher compared to other inputs. In other words, the pedestrian crossing a certain road may be assigned a higher weight compared to e.g. uncertain detection of a further moving object near the road crossing. The reliability may also depend on the distance between the robot and the pedestrian and other factors.

In some embodiments, the method can further comprise the mobile robot starting to cross the road within a predetermined time interval based on the pedestrian's motion pattern. That is, there may be a certain "safe" time window for the robot to cross based on the pedestrian crossing.

In some embodiments, the method can further comprise the mobile robot starting the road crossing no later than 3 seconds, preferably no later than 2 seconds, such as no later than 1 second, starting from when a pedestrian has been detected to start the road crossing. The pedestrian may be crossing from the same side of the road as the robot and/or from the opposite side.

In some embodiments, the method can further comprise calculating a time at which the pedestrian will exit the road crossing upon determining that the pedestrian intends to cross the road. In some such embodiments, the method can further comprise calculating a time needed for the mobile robot to cross the road. It can then further comprise the mobile robot starting to cross the road only upon determining that it will exit the road crossing prior to or within a predetermined time interval of the pedestrian exiting the road crossing.

In a second embodiment, a system for mobile robot operations is disclosed. The system comprises at least one mobile robot configured to travel on pedestrian pathways. The robot comprises at least one sensor configured to capture data related to the robot's surroundings and to collect data relating to moving objects in said surroundings. The system also comprises at least one pedestrian detector. The pedestrian detector is configured to process the sensor data to at least detect a pedestrian moving with a motion pattern. It is also configured to analyze the pedestrian's motion pattern, and determine and output the pedestrian's intent.

In some embodiments, the sensor can be further configured to collect data on moving objects at and within a predefined region around a road crossing. The sensor can be as described above in relation to the method embodiments and/or below with reference to the figures.

In some such embodiments, the pedestrian detector can be further configured to analyze the pedestrian's motion pattern to determine and output the pedestrian's intent to cross a traffic road at the road crossing.

In some such embodiments, the system can further comprise at least one road crossing module configured to receive at least the pedestrian detector's output as an input and output at least a decision on whether the mobile robot should cross the traffic road. The road crossing module can be advantageously configured to use the pedestrian's intent to cross the road as only one of the inputs for the decision on whether the robot should cross the road. Particularly, some other parameters and/or predetermined constraints may be used to output a decision to not cross the road, despite a pedestrian crossing it. For example, such a parameter may comprise a detected traffic light showing red for pedestrians.

The system can be configured to carry out the method according to any of the preceding method embodiments.

In a third embodiment, a mobile robot configured to travel on pedestrian pathways is disclosed. The robot comprises at least one sensor configured to capture data related to the robot's surroundings and to collect data relating to moving objects in said surroundings. The robot also comprises at least one processing component configured to process the sensor data to at least detect a pedestrian moving with a motion pattern; and analyze the pedestrian's motion pattern, and determine and output the pedestrian's intent.

In some embodiments, the sensor can be further configured to collect data on moving objects at and within a predefined region around a road crossing.

In some embodiments, the processing component can be further configured to analyze the pedestrian's motion pattern to determine and output the pedestrian's intent to cross a traffic road at the road crossing.

In some such embodiments, the processing component can be further configured to run a road crossing module configured to receive at least the pedestrian detector's output as an input and output at least a decision on whether the mobile robot should cross the traffic road.

The robot can be configured to carry out the method according to any of the preceding method embodiments.

The processing component can be configured to carry out any of the method steps according to any of the preceding method embodiments.

While in the present third embodiment the computations can be carried on the processing component of the mobile robot, they can also be split up between the mobile robot and e.g. a remote server and/or entirely be covered on the remote server. In other words, the processing can be done locally on the robot and/or remotely on a different processing component (such as e.g. a server).

The mobile robot can be an autonomous or a semi-autonomous robot configured for ground-based travel. Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

The present invention is also defined by the following numbered embodiments.

Below is a list of method embodiments. Those will be indicated with a letter "M". Whenever such embodiments are referred to, this will be done by referring to "M" embodiments.

M1. A method for mobile robot operations, the method comprising

A mobile robot comprising at least one sensor configured to capture data related to the robot's surroundings travelling on a pedestrian pathway;

The mobile robot using the sensor to collect data relating to moving objects in the robot's surroundings;

Detecting at least one pedestrian within the collected data, said pedestrian moving with a motion pattern;

Analyzing the pedestrian's motion pattern to determine and output the pedestrian's intent.

Embodiments Related to Road Crossing

M2. The method according to the preceding embodiment further comprising the mobile robot approaching a traffic road at a pedestrian crossing.

M3. The method according to the preceding embodiment further comprising using the sensor to collect data on moving objects at and within a predefined region around the road crossing.

M4. The method according to any of the two preceding embodiments further comprising analyzing the pedestrian's motion pattern to determine and output the pedestrian's intent to cross the traffic road at the road crossing.

M5. The method according to the preceding embodiment further comprising using the analysis of the pedestrian's motion pattern as at least one input of a road crossing module, and outputting at least a decision on whether the mobile robot should cross the traffic road.

Embodiments Related to Using Radar

M6. The method according to the preceding embodiment wherein the at least one sensor comprises at least one radar sensor.

M7. The method according to the preceding embodiment wherein the radar sensor is configured to detect speed of moving objects in its field of view.

M8. The method according to any of the two preceding embodiments wherein the radar sensor is configured to detect distance to objects in its field of view.

M9. The method according to any of the three preceding embodiments wherein the radar sensor comprises at least one imaging radar sensor.

M10. The method according to the preceding embodiment wherein the imaging radar sensor is configured to detect position of objects in its field of view.

M11. The method according to any of the five preceding embodiments wherein the radar sensor comprises at least one continuous wave radar.

Embodiments Related to Identifying Pedestrian/Intent of Pedestrian (not Limited to Radar)

M12. The method according to any of the preceding embodiments wherein detecting the pedestrian comprises identifying a moving object detected in the collected data as a moving pedestrian.

M13. The method according to the preceding embodiment wherein identifying the moving object as the moving pedestrian comprises detecting movement of the pedestrian's extremities.

M14. The method according to the preceding embodiment wherein the movement of both upper and lower extremities is detected and used to identify the moving pedestrian.

M15. The method according to any of the three preceding embodiments wherein identifying the moving pedestrian further comprises detecting at least one extremity of the pedestrian moving with a speed within a predetermined interval.

M16. The method according to the preceding embodiment wherein identifying the moving pedestrian further comprises detecting at least one extremity of the pedestrian moving in a predetermined pattern.

M17. The method according to any of the preceding embodiments wherein outputting the pedestrian's intent comprises outputting an estimated trajectory of the pedestrian.

M18. The method according to any of the preceding embodiments wherein outputting the pedestrian's intent comprises outputting a prediction of the pedestrian's future motion.

M19. The method according to any according to any of the preceding embodiments wherein outputting the pedestrian's intent comprises outputting a prediction of the pedestrian's future action.

M20. The method according to any of the preceding method embodiments wherein analyzing the motion pattern comprises processing sensor data taken at a plurality of consecutive time stamps.

M21. The method according to the preceding embodiment further comprising extrapolating pedestrian motion based on the detected motion pattern.

M22. The method according to any of the preceding embodiments wherein analyzing the motion pattern comprises using a machine learning algorithm.

M23. The method according to any of the preceding embodiments and with features of embodiment M5 wherein analyzing the pedestrian's intent further comprises detecting at least one of Position of pedestrian in relation to edge of the traffic road;

Pedestrian movement direction;

Pedestrian movement speed;

Pedestrian movement speed variation.

Embodiments Relating to Ultrasonic Sensor

M24. The method according to any of the preceding method embodiments wherein the sensor comprises at least one ultrasonic sensor.

M25. The method according to the preceding embodiment wherein the sensor comprises at least one ultrasonic and at least one radar sensor, preferably a plurality of ultrasonic and radar sensors.

M26. The method according to the preceding embodiment wherein the method further comprises using data related to moving objects collected by at least one ultrasonic and at least one radar sensor for detecting and analyzing moving pedestrians in the robot's surroundings.

Embodiments Relating to Decision on Road Crossing

M27. The method according to any of the preceding method embodiments and with features of embodiment M5 wherein the method further comprises using at least one further input for the road crossing module.

M28. The method according to the preceding embodiment wherein the further input is not dependent on detected pedestrians' motion patterns.

M29. The method according to any of the two preceding embodiments wherein the further input comprises at least one of Detection of road vehicles approaching the road crossing;

Detection of a pedestrian traffic light signal;

Detection of other mobile robots approaching the road crossing.

M30. The method according to any of the two preceding embodiments further comprising collecting data related to the road crossing with a second sensor, the second sensor being different from the sensor and using the second sensor data as part of the road crossing module.

M31. The method according to any of the three preceding embodiments further comprising detecting road vehicles approaching the road crossing and using the detection as another input into the road crossing module.

M32. The method according to any of the four preceding embodiments further comprising assigning a variable weight to the pedestrian detection based on road crossing conditions.

M33. The method according to the preceding embodiment wherein the road crossing conditions comprise at least one of Traffic road width;

Presence of pedestrian traffic light;

Historic data related to robot crossing the given road crossing;

Weather;

Visibility conditions;

Presence of occluding objects within the robot's field of view of the traffic road;

Time of the day or day of the week.

M34. The method according to any of the two preceding embodiments wherein the decision on whether the mobile robot should cross the road at a given time is calculated based on the assigned weight of the pedestrian detection and at least one further input.

M35. The method according to any of the three preceding embodiments wherein the inputs into the road crossing module are ranked based on reliability and wherein the detection of a pedestrian crossing the road is ranked relatively higher compared to other inputs.

Embodiments Related to the Speed of Robot Crossing after Pedestrian

M36. The method according to any of the preceding method embodiments and with features of embodiment M5 wherein the method further comprises The mobile robot starting to cross the road within a predetermined time interval based on the pedestrian's motion pattern.

M37. The method according to any of the preceding method embodiments and with features of embodiment M5 wherein the method further comprises The mobile robot starting the road crossing no later than 3 seconds, preferably no later than 2 seconds, such as no later than 1 second, starting from when a pedestrian has been detected to start the road crossing.

M38. The method according to the any of the preceding method embodiments and with features of embodiment M5 wherein the method further comprises Upon determining that the pedestrian intends to cross the road, calculating a time at which the pedestrian will exit the road crossing.

M39. The method according to the preceding embodiment further comprising

Calculating a time needed for the mobile robot to cross the road; and

The mobile robot starting to cross the road only upon determining that it will exit the road crossing prior to or within a predetermined time interval of the pedestrian exiting the road crossing.

Below is a list of system embodiments. Those will be indicated with a letter "S". Whenever such embodiments are referred to, this will be done by referring to "S" embodiments.

S1. A system for mobile robot operations, the system comprising

At least one mobile robot configured to travel on pedestrian pathways and comprising At least one sensor configured to capture data related to the robot's surroundings and to collect data relating to moving objects in said surroundings, and At least one pedestrian detector configured to Process the sensor data to at least detect a pedestrian moving with a motion pattern; and Analyze the pedestrian's motion pattern, and determine and output the pedestrian's intent.

S2. The system according to the preceding embodiment wherein the sensor is further configured to collect data on moving objects at and within a predefined region around a road crossing.

S3. The system according to the preceding embodiment wherein the pedestrian detector is further configured to analyze the pedestrian's motion pattern to determine and output the pedestrian's intent to cross a traffic road at the road crossing.

S4. The system according to the preceding embodiment further comprising at least one road crossing module configured to receive at least the pedestrian detector's output as an input and output at least a decision on whether the mobile robot should cross the traffic road.

S5. The system according to any of the preceding system embodiments configured to carry out the method according to any of the preceding method embodiments.

Below is a list of device embodiments. Those will be indicated with a letter "D". Whenever such embodiments are referred to, this will be done by referring to "D" embodiments.

D1. A mobile robot configured to travel on pedestrian pathways, the robot comprising At least one sensor configured to capture data related to the robot's surroundings and to collect data relating to moving objects in said surroundings;

At least one processing component configured to

Process the sensor data to at least detect a pedestrian moving with a motion pattern; and Analyze the pedestrian's motion pattern, and determine and output the pedestrian's intent.

D2. The robot according to the preceding embodiment wherein the sensor is further configured to collect data on moving objects at and within a predefined region around a road crossing.

D3. The robot according to the preceding embodiment wherein the processing component is further configured to analyze the pedestrian's motion pattern to determine and output the pedestrian's intent to cross a traffic road at the road crossing.

D4. The robot according to the preceding embodiment wherein the processing component is further configured to run a road crossing module configured to receive at least the pedestrian detector's output as an input and output at least a decision on whether the mobile robot should cross the traffic road.

D5. The robot according to any of the preceding robot embodiments configured to carry out the method according to any of the preceding method embodiments.

D6. The robot according to the preceding embodiment wherein the processing component is configured to carry out any of the method steps according to any of the preceding method embodiments.

The present technology will now be discussed with reference to the accompanying drawings.

DESCRIPTION OF EMBODIMENTS

Figure 1:
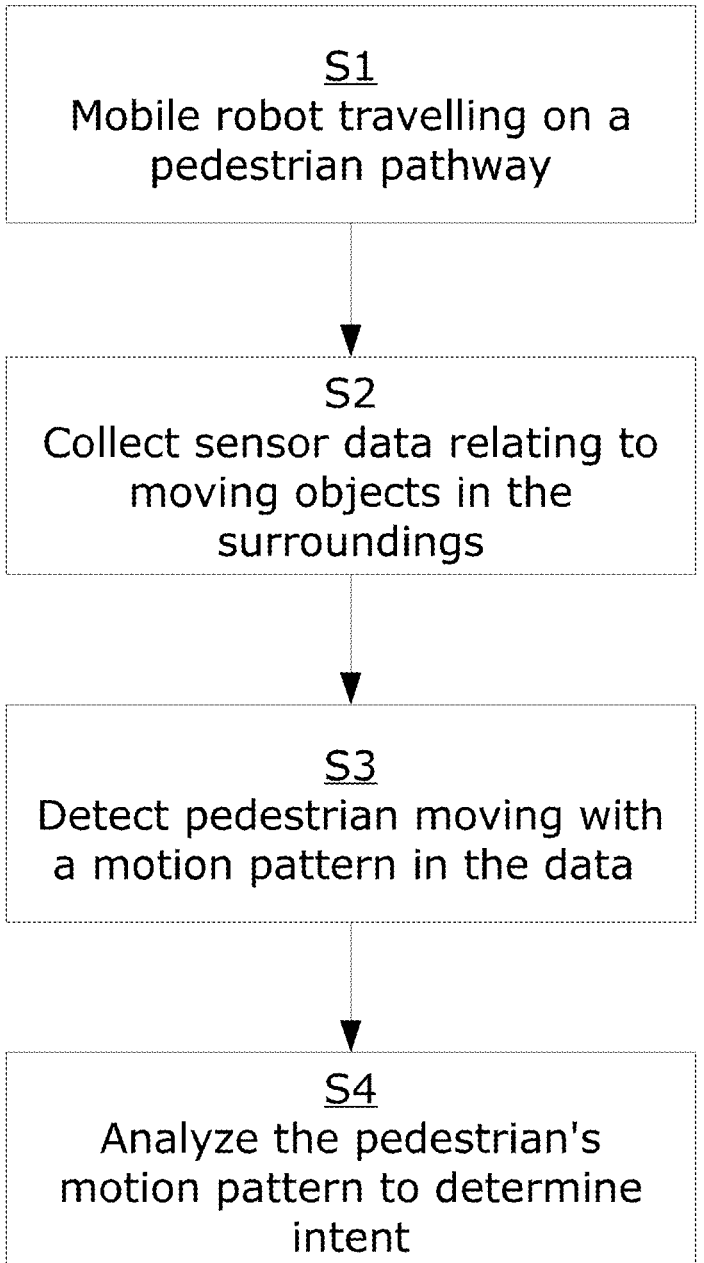
FIG. 1 depicts an exemplary embodiment of a method for mobile robot operations.

FIG. 1 schematically depicts an embodiment of a method for mobile robot operations as per the present invention.

In a first step, S1, a mobile robot is travelling on a pedestrian pathway. The robot may be travelling autonomously and/or semi-autonomously. The mobile robot may be as described with reference to FIGS. 5 and 6. The pedestrian pathway may refer to any type of path that may be used by a pedestrian such as sidewalks, footpaths, walkway, trail, passageway or the like.

In S2, sensor data relating to moving objects in the robot's surroundings is collected. The mobile robot preferably comprises the sensor. The sensor may preferably comprise at least one range/distance sensor such as a radar. There may be a plurality of sensors of the same and/or different types, all installed on the mobile robot. The data collected by the sensor may be limited by its range. Therefore, the robot's surroundings may refer to a region defined by the sensor's range and/or field of view.

In S3, pedestrians moving with a motion pattern are detected in the data. This step may be performed on the mobile robot (e.g. by a processing component such as a processor) and/or remotely e.g. on a server that the robot may communicate with. The motion pattern may refer to any movement performed by the pedestrians. Particularly, it may refer to characteristic movements of limbs and/or extremities of the pedestrians that may be representative of walking.

In S4, the pedestrian's motion pattern is analyzed to determine their intent. This intent may be particularly representative of the pedestrian's intended upcoming trajectory. In other words, the motion pattern may indicate where the pedestrian will move to if they continue their motion. Put differently, based on the motion pattern, the pedestrian's movement may be projected into the future to estimate what their movement will be like and/or what action they will take. In a preferred example, the pedestrian's motion pattern may be analyzed to determine whether the pedestrian is intending to (and/or started to) cross a traffic road.

Figure 2:
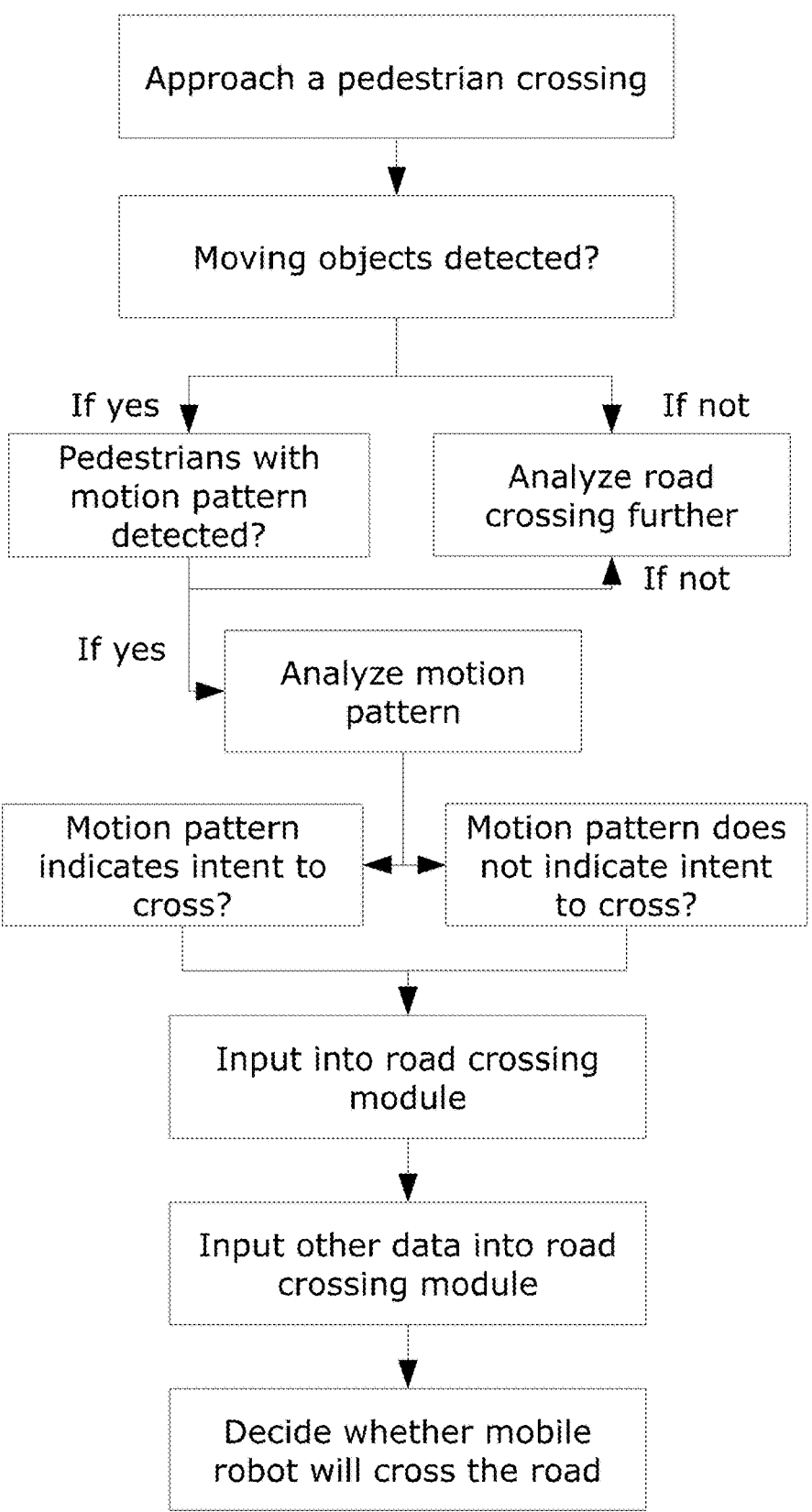
FIG. 2 depicts a flowchart of an exemplary preferred embodiment of the method related to mobile robots crossing traffic roads.

FIG. 2 depicts a preferred exemplary flowchart representative of implementing the present inventive method in a particular setting of road crossing.

A critical part of the process to cross a road may be a decision when to start moving from sidewalk to the road (starting to cross).

At the time the mobile robot attempts to make that decision, pedestrians could be crossing in the vicinity of the robot as well. Pedestrians are also attempting to make similar decisions, and they can have some advantages over mobile robot: pedestrian can have a different (e.g. higher) vantage point and different understanding of the traffic and social context (e.g. a vehicle driver or a person designated to regulate traffic could be signaling to pedestrian using hand gestures).

Therefore, the movement of pedestrians could be a useful input to mobile robot decision-making process—input that would be difficult for the mobile robot to obtain by other means.

As shown in FIG. 2, the mobile robot approaches a pedestrian crossing. If moving objects are detected in the data collected by the robot's sensor (and/or multiple sensors), the data is further analyzed to determine whether any moving objects correspond to pedestrians with a motion pattern. If no moving objects are detected, the mobile robot may continue to analyze the road crossing by other techniques (e.g. look for approaching cars, contact a remote operator, look for pedestrian traffic lights or signals, or simply start crossing the road).

If pedestrians with a motion pattern are detected in the sensor data (e.g. by detecting one of predetermined motion/movement patterns corresponding to pedestrians), the motion pattern is analyzed further. Otherwise, the robot continues to either analyze the road crossing further, or simply cross the road.

The motion pattern analysis may comprise detecting a pedestrian's intent to cross the road, or detecting an intent to not cross the road. The former may be identified by the pedestrian approaching the edge or start of the road crossing (stored within the robot's map of the surroundings). Either determined intent of the pedestrian may be used as one of the inputs onto a road crossing module, which ultimately may output a decision on whether the robot should cross the road (e.g. a probability that it is safe to do so, which may then be implemented if it is above a predetermined threshold).

Further inputs may also be sent to the road crossing module. Such inputs may relate to any approaching vehicles detected by the robot, historic data related to the particular road crossing, data related to obstructions in the field of view of the robot, weather or visibility conditions, time of day and day of the week, or the like.

The final output may then comprise a decision on whether the mobile robot will cross the road. In the case of a positive decision (e.g. an estimation that it is safe to do so above a predetermined threshold), the mobile robot may proceed to cross the road.

Below follows a practical example of one implementation of the present invention.

The mobile robot may be travelling on a sidewalk e.g. on the way to deliver an item to a recipient. The robot's planned path includes a traffic road that needs to be crossed. The robot approaches this road at a pedestrian crosswalk (either indicated officially or corresponding to an intersection if no crosswalks are present in the vicinity). The location and topology of the crosswalk is stored within the robot's map of its surroundings. The robot's position with respect to this map can be obtained by a localization process.

The mobile robot may then start scanning its surroundings to look for any pedestrians crossing the road, approaching the crosswalk and/or walking nearby. The specific boundaries of the crosswalk do not need to be detected using optical sensors or the like, as pedestrians can often cross roads in locations outside the exact boundaries of crosswalk markings (which could be seen using optical sensors). Instead, a designated place to cross may be marked on a digital map of the area, known to mobile robot.

Pedestrian movement can be detected using radar sensors. Radars are less sensitive to lighting conditions, rain, and snow than optical sensors, and are more accurate in measuring the speed of objects. In particular, Frequency Shift Keying (FSK) radar could be used, which outputs distance to and speed of objects in its field of view. Furthermore, imaging radars could be used, which also output position of each object.

Also, various techniques could be used to identify a radar target as a walking pedestrian. Walking pedestrians move their hands and legs in regular cyclic patterns, and these patterns are present in output of a radar observing the pedestrian. For example, a pedestrian walking at 1.5 meters/sec will typically have at some point one leg moving at 3.0 meters/sec, then stopping, then again moving at 3.0 meters/sec. These patterns in radar output can be used to identify that the object is indeed a pedestrian, and not a vehicle. These cyclic patterns can be identified using Digital Signal Processing techniques such as Finite Impulse Response (FIR) filters or Infinite Impulse Response (IIR) filters; or they could be identified using Machine Learning methods such as Artificial Neural Networks (a particularly useful method is to form a 2-dimensional matrix of numbers, where one dimension corresponds to time and the other dimension corresponds to speed of the object in radar output; and then inputting that matrix to a Convolutional Neural Network trained to find such "walking pedestrian" pattern in its input data)

The present invention is particularly focused on inferring whether a pedestrian has decided to start crossing the road rather than inferring a right of way of vehicle or whether a pedestrian is present on the crosswalk. This detection can be made based on e.g.:

position of pedestrian in relation to the edge of road (curb)
  pedestrian movement direction
  pedestrian movement speed
  pedestrian movement speed change in time (e.g. is the pedestrian accelerating or slowing down)

These measurements can be obtained using preferably at least one non-optical sensor as discussed above. In some crossings, the typical vehicle driving trajectory is some distance (e.g. a meter or more) away from the edge of road. In such situations, a pedestrian could be on road surface, but has still not decided to cross the road. Such local context can be taken into account when deciding whether current pedestrian movement measurements do actually indicate that pedestrian has decided to cross. This can be done by mobile robots taking measurements of typical vehicle driving trajectories in this location, sending these measurements to a server, and the server could incorporate this information into a digital map that robots are using.

Figure 3A:
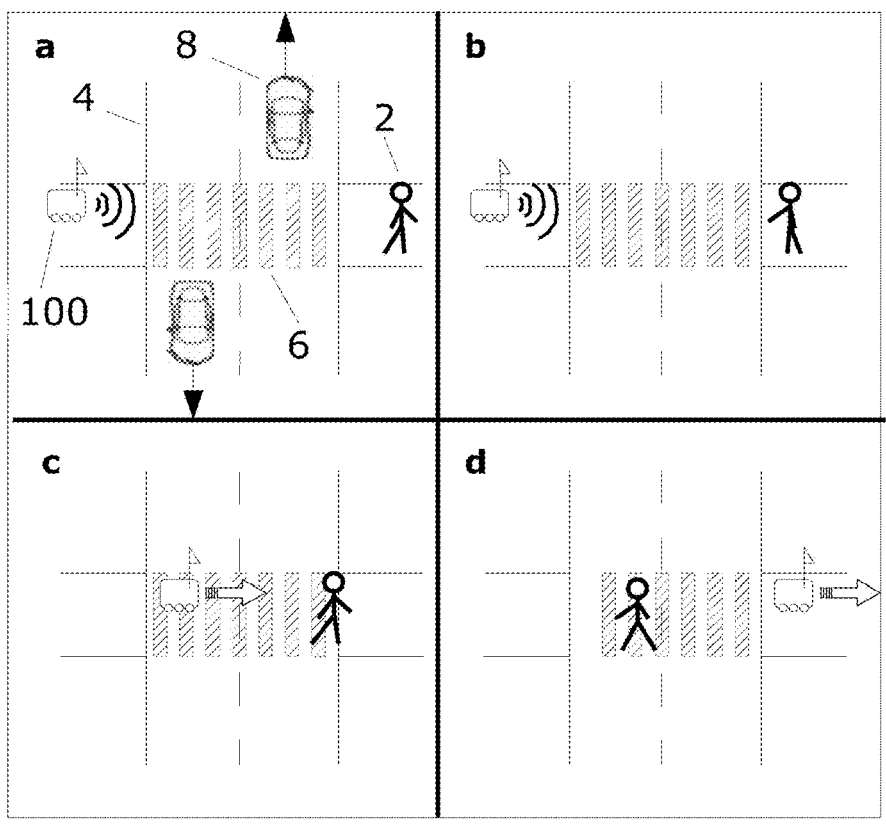
FIGS. 3a and 3b schematically depict possible scenarios of mobile robot crossing a traffic road.
Figure 3B:
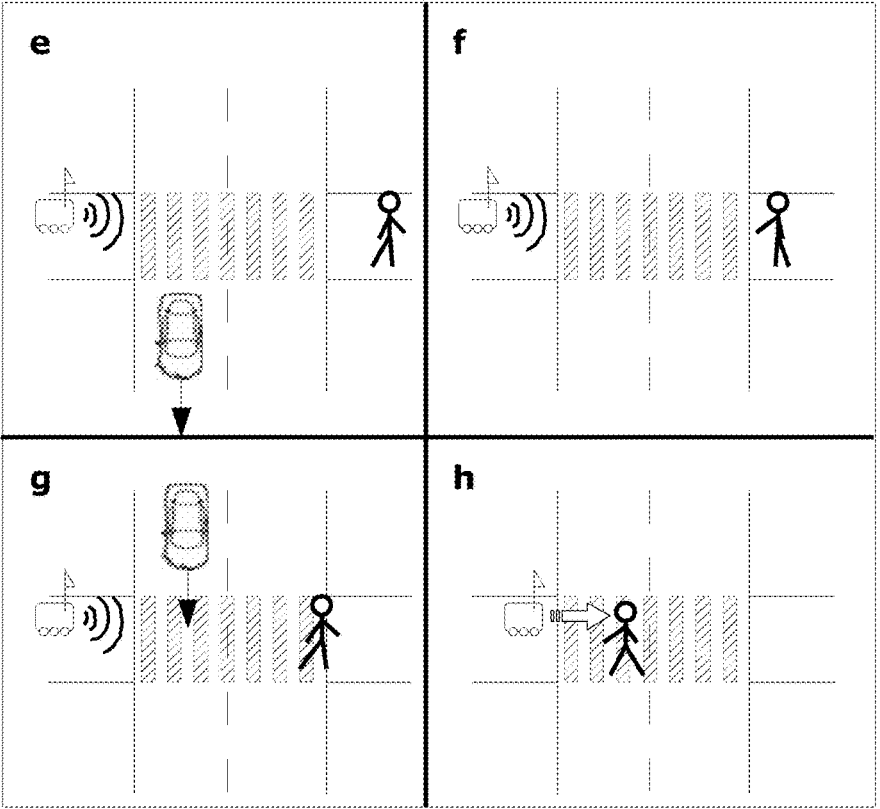

FIGS. 3a and 3b depict exemplary sketches of possible situations related to implementing the underlying invention.

FIG. 3a, sketch a shows the mobile robot 100 approaching a traffic road 4 at the pedestrian road crossing (crosswalk) 6. A pedestrian 2 is also approaching the same crossing 6, but from the other side of the crosswalk 6. Two road vehicles 8 are shown moving away from the crosswalk 6. The robot is using its sensor to detect and identify the pedestrian (schematically depicted as curved lines in front of the robot 100).

In sketch b, the pedestrian 2 has further approached the crosswalk 6. The pedestrian's extremities have performed a certain movement as part of this approach (indicated in the figure by the different relative positions of the upper and lower extremities), which can preferably be detected by the robot's sensor (e.g. a radar). This, together with the general speed and distance to the pedestrian 2 (and/or the pedestrian's distance to the edge of the crosswalk 6 as determined via the location of the crosswalk 6 in the map and the robot's relative position to it) can be used to infer the intent of the pedestrian 2 to start crossing the road. The robot 100 uses this fact, as well as other inputs as part of a road crossing module to determine whether it should also start crossing the road.

In sketch c, the pedestrian 2 has started to cross the road 4 via the crosswalk 6. The mobile robot 100 has also started to cross, based on the decision output by the road crossing module and partially influenced by the pedestrian's crossing. The robot 100 starts to cross immediately after deciding to do so and at a speed that may ensure that the crossing is completed as soon as possible. Optionally, it may be first further estimated when the pedestrian 2 will finish the road crossing (e.g. based on the pedestrian's motion pattern) and the crossing may only be started if the robot 100 can finish the crossing at the same time or earlier than the pedestrian 2.

In sketch d, the robot 100 has finished the crossing before the pedestrian 2, and continues on its way. While crossing, the robot 100 may move in such a way so as to not inconvenience the pedestrian and avoid any risk of colliding with them.

In FIG. 3b, a slightly different situation is depicted. In sketch e, the mobile robot 100 detects the approaching pedestrian 2. A road vehicle 8 is also seen moving away from the crosswalk 6. In sketch f, the pedestrian's intent to start crossing the road is detected and used as an input into the road crossing module.

However, as shown in sketch g, the output of the road crossing module is the decision to not cross the road, as an approaching vehicle has been detected (and used as another input into the road crossing module). Based on the fact that the pedestrian 2 is crossing from the other side, and based on the relative distance and velocities of the pedestrian 2 and the approaching road vehicle 8, it has been determined that the road vehicle 8 is likely to continue movement and not stop and wait for the pedestrian to cross. Therefore, starting to cross would not be safe for the mobile robot 100, although the pedestrian is in the crosswalk.

In sketch h, the mobile robot 100 start to cross the road 4, as the output of the road crossing module has now changed, since no further dangerous objects (e.g. moving road vehicles 8) have been detected. The pedestrian 2 is still crossing the road 4, which may also have been used as an input of the road crossing detector.

Figure 4:
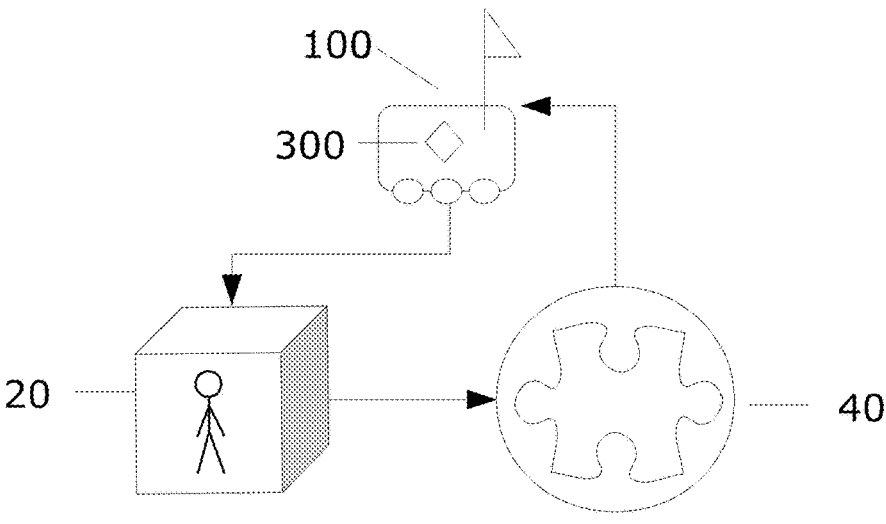
FIG. 4 schematically depicts an embodiment of a system for mobile robot operations as per an embodiment of the present invention.

FIG. 4 shows a schematic overview of one exemplary embodiment of a system for mobile robot operations as per the underlying invention. Mobile robot 100 comprises a sensor 300. The sensor 300 may comprise a plurality of sensors of the same or different types. Preferably, the sensor 300 comprises at least one radar sensor.

The sensor data is fed into a pedestrian detector 20. The pedestrian detector 20 may be a particular software-implemented detector running on a processing component (e.g. processor) of the mobile robot. Additionally or alternatively, parts or all of the pedestrian detector 20 may be running on a remote server or the like (not depicted).

The pedestrian detector 20 then determines whether any pedestrians with a motion pattern are present in the sensor data. Particularly, pedestrians may be identified by a certain predetermined motion pattern in the data. The motion pattern of the pedestrian may also be analyzed as part of the pedestrian detector (preferably over time, e.g. over a range of sensor data taken at consecutive time stamps or the like). The pedestrian detector 20 then outputs the analysis of the pedestrian's motion pattern, which is input into a road crossing module 40.

The road crossing module 40 may be implemented as part of the mobile robot software and/or run entirely or partially on a remote server communicating with the mobile robot. The road crossing module 40 may comprise a software-implemented algorithm that takes as inputs various information about a road crossing and outputs a decision to cross the road or not (which may be represented e.g. by a safety score to do so or the like). The road crossing module 40 then may send the decision to the mobile robot 100.

Figure 5:
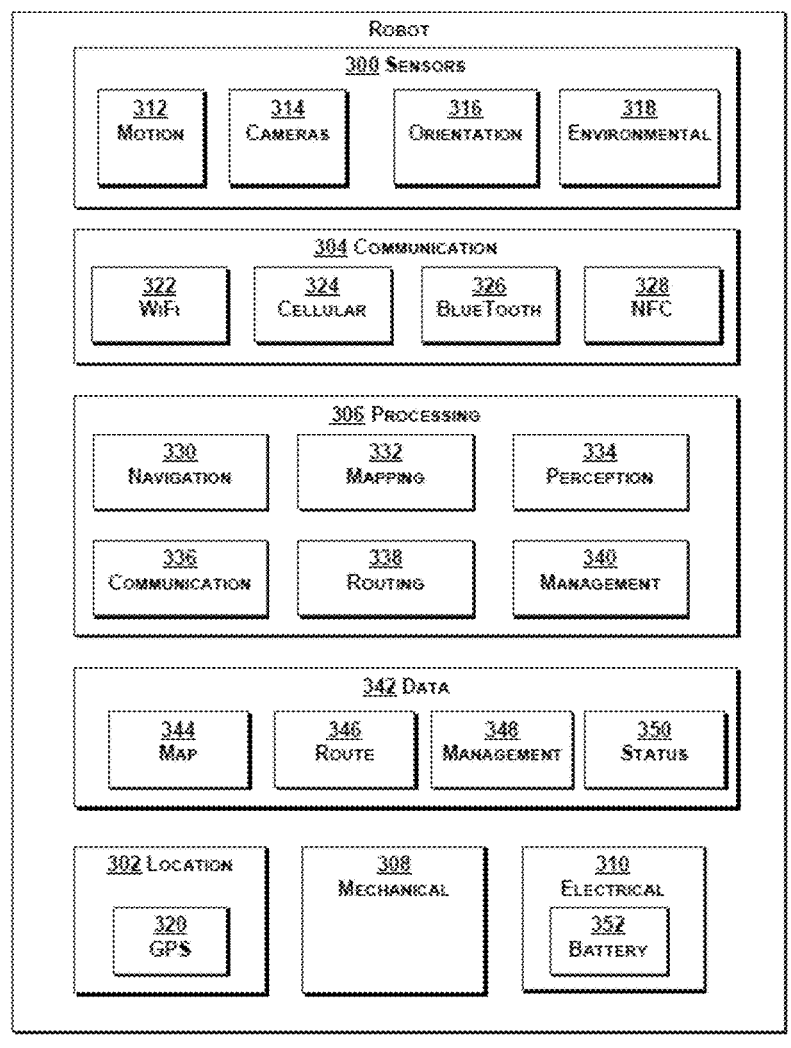
FIG. 5 depicts a schematic embodiment of mobile robot configuration.

With reference to FIG. 5, an exemplary robot 100 preferably includes various sensors 300, location mechanism(s) 302, communication mechanism(s) 304, and processing mechanisms 306. The robot 100 also includes mechanical and electrical components 308, 310. Robot 100 can include the communication mechanism 304, the processing mechanism 306 and/or a database 342.

The sensors 300 may include one or more of the following: motion sensor(s) 312 (e.g., accelerometer(s), ultrasonic sensors, radars, and the like), cameras 314 (e.g. visual cameras, time of flight cameras, infrared cameras, and the like), orientation sensor(s) 316 (e.g., gyroscope(s)), and environmental sensor(s) 318 (e.g., temperature and/or humidity sensors).

The location mechanism(s) 302 preferably includes at least a satellite navigation system that provides or supports autonomous geo spatial positioning with global coverage. The location mechanism(s) 302 may include mechanisms 320 supporting, e.g., GPS, GLONASS, Galileo, Beidou, and other regional systems.

The communication mechanism(s) 304 preferably include wireless communication mechanism(s) 322 (e.g., WiFi), and cellular communication mechanism(s) 324 (e.g., one or more cellular modems). The communication mechanism(s) 304 may also include short range wireless communication mechanism(s) 326 (e.g., Bluetooth® or Zigbee or the like) and or near field communication (NFC) mechanism(s) 328.

The processing mechanisms 306 may include mechanisms that provide and/or support the following functionality: navigation 330, for example, where the robot is present currently and where it needs to go. Mapping 332, can establish and/or complete and/or actualize an optimum path. Perception 334 of the information, communication 336 with the robot or the framework, can be done using radio signals, it will allow the robot to be in contact with the receiver and also will be easier for the control unit to know in case of mishaps. It can be short ranged using Bluetooth or the like or long range using satellite and/or CTI (computer telephony integration), where a telephone can be equipped on the robot 100. The processing mechanisms 306 may be implemented in hardware, software, firmware, or combinations thereof. The various listed processing mechanisms 306 and their logical organization is only exemplary, and different and/or other processing mechanisms may be included, having different and/or other logical organizations. The processing can be but is not restricted to be performed at the control system. Alternatively, it can be fitted in the robot. After the processing the data 342 can be used for the various aspects as mentioned in 342.

The various processing mechanisms 306 may include associated data 342. The various data 342 and their logical organization described here are only exemplary, and different and/or other data may be included, having different and/or other logical organizations. For example, the navigation mechanism 330 and the mapping mechanism 332 may use map data 344 and route data 346, and the management mechanism 340 may use management data 348.

The robot 100 may also maintain status data 350 which may include information about the robot's configuration (e.g., whether the robot has any specialized containers or mechanisms), current location, battery status (e.g., remaining power, time since last charge, etc.), health, maintenance status (e.g., time since last service, time till next service, etc.), and current activity (e.g., waiting, on delivery, being maintained, charging battery, etc.). If on a delivery, the status data 350 may include information about the delivery contents, recipient and location. The status data can also be used by the receiver and/or the user to know the exact location of the robot and how much time it will take for the package to be delivered. This can also provide information if the robot 100 is stuck. For example, in case there is a pedestrian and the robot needs to wait or slow down and/or if the robot is waiting to cross a traffic road.

As explained below, the robot 100 preferably operates in a framework that may include one or more other components (e.g., pods, hubs, maintenance units such as battery changing units, and robot-moving/carrying vehicles). The robot's current location 404 may include an indication of whether the robot is currently in or on or associated with one or more of these other components.

The listed configuration is exemplary, and different and/or other information may also be maintained.

Although shown here as having separate functionality, it should be appreciated that the various processing mechanisms 306 may interact and may overlap in implementation.

The mechanical and electrical components 308, 310 drive and power the robot 100, under the guidance and supervision of the processing mechanisms 306, possibly with external assistance (if needed and if the robot is not fully autonomous).

The electrical component(s) 310 preferably include one or more batteries 352 used to power the robot 100. The one or more batteries 352 are preferably rechargeable and replaceable. It is also not restricted to the use of one or more electric battery/ies, these can be solar. A solar panel can be placed on the robot. When the robot is waiting for the user it can switch to a standby mode. In this mode it can either save energy or if there is sun the solar panel can use the energy to charge the battery. An exemplary battery 352 is described in European patent application EP 17173111.0, the entire contents of which are fully incorporated herein by reference for all purposes.

Figure 6:
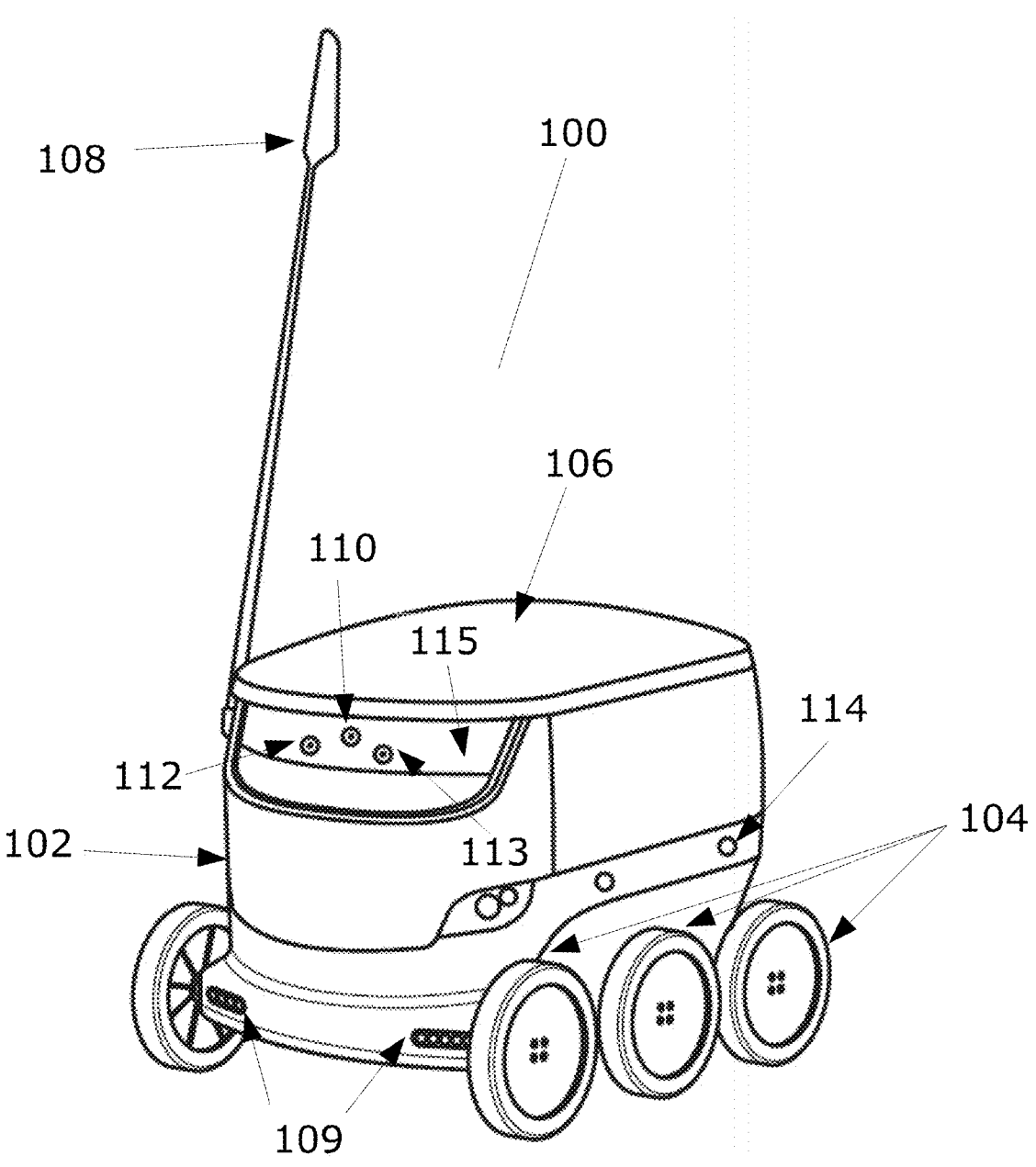
FIG. 6 depicts an exemplary mobile robot as per the present invention.

FIG. 6 demonstrates an exemplary embodiment of the mobile robot 100. The mobile robot 100 can comprise a delivery or a vending robot, that is, it can transport and deliver packages, consumable items, groceries or other items to customers. Preferably, the mobile robot 100 is outfitted with a beverage module (not shown in the figure).

The mobile robot 100 comprises a robot body 102. The body 102 comprises an item compartment in which items can be placed and transported by the robot (not shown in the present figure).

The mobile robot 100 further comprises a robot motion component 104 (depicted as wheels 104). In the present embodiment, the robot motion component 104 comprises six wheels 104. This can be particularly advantageous for the mobile robot 100 when traversing curbstones or other similar obstacles on the way to delivery recipients.

The mobile robot 100 comprises a lid 106. The lid 106 can be placed over the item compartment and locked to prevent unauthorized access to the beverage module.

The mobile robot 100 further comprises a robot signaling device 108, depicted here as a flagpole or stick 108 used to increase the visibility of the robot 100. Particularly, the visibility of the robot 100 during road crossings can be increased. In some embodiments, the signaling device 108 can comprise an antenna. The mobile robot 100 further comprises robot headlights 109 configured to facilitate the robot's navigation in reduced natural light scenarios and/or increase the robot's visibility further. The headlights are schematically depicted as two symmetric lights 109, but can comprise one light, a plurality of lights arranged differently and other similar arrangements.

The mobile robot 100 also comprises robot sensors 110, 112, 113, 114. The sensors are depicted as visual cameras (110, 112, 113) and ultrasonic sensors (114) in the figure, but can also comprise radar sensors, lidar sensors, time of flight cameras and/or other sensors. Further sensors can also be present on the mobile robot 100. One sensor can comprise a front camera 110. The front camera 110 can be generally forward facing. The sensors may also comprise front (112, 113), side and/or back stereo cameras. The front stereo cameras 112 and 113 can be slightly downward facing. The side stereo cameras (not depicted) can be forward-sideways facing. The back camera (not depicted) may be a mono or a stereo camera can be generally backward facing. The sensors present on multiple sides of the robot can contribute to its situational awareness and navigation capabilities. That is, the robot 100 can be configured to detect approaching objects and/or hazardous moving objects from a plurality of sides and act accordingly.

The robot sensors can also allow the robot 100 to navigate and travel to its destinations at least partially autonomously. That is, the robot can be configured to map its surroundings, localize itself on such a map and navigate towards different destinations using in part the input received from the multiple sensors.

The robot further comprises a front panel 115. The front panel 115 may house one or more of the robot's sensors such as cameras (in the depicted figure, the front panel houses sensors 110, 112 and 113). The front panel 115 may comprise a transparent panel protecting the sensors from impacts, dirt or the like. For example, the front panel 115 may comprise substantially transparent plastic. The front panel 115 may further comprise a protective layer described in detail with reference to FIG. 4.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for mobile robot operations, the method comprising:
   a mobile robot comprising at least one sensor configured to capture data related to the mobile robot's surroundings travelling on a pedestrian pathway and approaching a traffic road at a road crossing;
   the mobile robot using the at least one sensor to collect data relating to moving objects in the mobile robot's surroundings at and within a predefined region around the road crossing;
   detecting at least one pedestrian within the collected data;
   detecting, of the at least one pedestrian, a particular pedestrian crossing the traffic road;
   detecting a position and movement of said particular pedestrian;
   calculating a time at which the pedestrian will exit the road crossing;
   calculating a time needed for the mobile robot to cross the traffic road;
   the mobile robot determining whether to cross the road, based on:
   (i) the position and movement of said particular pedestrian, and
   (ii) whether the robot is able to start the road crossing within a predetermined time from the detection of said particular pedestrian crossing the traffic road; and
   (iii) whether the mobile robot will exit the road crossing prior to or within a predetermined time interval of the pedestrian exiting the road crossing; and
   the mobile robot starting to cross the road upon a positive determination.

2. The method according to claim 1,
   wherein said at least one pedestrian moves with a motion pattern; and
   wherein the method comprises for at least one of the at least one pedestrian, analyzing the pedestrian's motion pattern to determine the pedestrian's intent,
   wherein analyzing the pedestrian's motion pattern to determine the pedestrian's intent comprises
   analyzing the pedestrian's motion pattern to determine the pedestrian's intent to cross the traffic road at the road crossing.

3. The method according to claim 1, wherein the method further comprises
   calculating a time at which the pedestrian will exit the road crossing; and
   calculating a time needed for the mobile robot to cross the traffic road; and
   the mobile robot starting to cross the traffic road upon determining that the mobile robot will exit the road crossing prior to or within a predetermined time interval of the pedestrian exiting the road crossing.

4. The method according to claim 2, wherein a decision on whether the mobile robot should cross the traffic road is based, at least in part, on an analysis of the pedestrian's motion pattern.

5. The method according to claim 4, wherein the determining on whether to cross the road is also based on an input that is independent of any of the at least one pedestrian's motion pattern.

6. The method according to claim 4, wherein the method further comprises assigning a variable weight to a pedestrian detection based on road crossing conditions of the traffic road and wherein the determining on whether to cross the traffic road at a given time is calculated based on the assigned weight of the pedestrian detection.

7. The method according to claim 1, wherein the at least one sensor comprises at least one radar sensor configured to detect a speed and/or distance of the moving objects in its field of view.

8. The method according to claim 1, wherein detecting at least one of the at least one pedestrian comprises identifying a moving object detected in the data relating to moving objects as a moving pedestrian.

9. The method according claim 8, wherein identifying the moving object as the moving pedestrian further comprises detecting at least one extremity of the pedestrian moving in a predetermined pattern.

10. The method according to claim 8, wherein identifying the moving object as the moving pedestrian comprises detecting movement of the pedestrian's extremities.

11. The method according to claim 2, wherein the method further comprises for at least one of the at least one pedestrian, extrapolating a motion of the pedestrian based on the pedestrian's motion pattern.

12. The method according to claim 11, wherein extrapolating the pedestrian's motion based on the pedestrian's motion pattern comprises determining where the pedestrian is heading based on the pedestrian's motion pattern.

13. The method according to claim 1, wherein the at least one sensor comprises at least one ultrasonic sensor and at least one radar sensor, and wherein the method further comprises using the data related to moving objects collected by the at least one ultrasonic sensor and the at least one radar sensor for detecting and analyzing moving pedestrians in the mobile robot's surroundings.

14. A system for mobile robot operations, the system comprising:

at least one mobile robot configured to travel on pedestrian pathways and to approach a traffic road at a road crossing, the at least one mobile robot further comprising at least one sensor configured to capture data related to the mobile robot's surroundings and to collect data relating to moving objects in said surroundings at and within a predefined region around the road crossing, and at least one pedestrian detector configured to:

process the sensor data to detect at least one pedestrian;

detect, of the at least one pedestrian, a particular pedestrian crossing the traffic road;

detect a position and movement of said particular pedestrian;

calculate a time at which the pedestrian will exit the road crossing;

calculate a time needed for the mobile robot to cross the traffic road; and determine whether to cross the road based on:

(i) the position and movement of said particular pedestrian, and (ii) whether the robot is able to start the road crossing within a predetermined time from the detection of said particular pedestrian crossing the traffic road, and (iii) whether the mobile robot will exit the road crossing prior to or within a predetermined time interval of the pedestrian exiting the road crossing; and wherein the mobile robot starts to cross the road upon a positive determination.

15. The system according to claim 14, wherein said at least one pedestrian moves with a motion pattern and wherein the pedestrian detector is further configured to analyze the pedestrian's motion pattern to determine the pedestrian's intent and to analyze the pedestrian's motion pattern to determine the pedestrian's intent to cross the traffic road at the road crossing and wherein the determining on whether to cross the traffic road is based at least in part on output of the pedestrian detector.

16. A mobile robot configured to travel on pedestrian pathways and to approach a traffic road at a road crossing, the mobile robot comprising:

at least one sensor configured to capture data related to the mobile robot's surroundings and to collect data relating to moving objects in said surroundings at and within a predefined region around the road crossing; and at least one processing component configured to:

process the sensor data to detect at least one pedestrian;

detect, a particular pedestrian, within the at least one pedestrian, crossing the traffic road;

detect a position and movement of said particular pedestrian;

calculate a time at which the pedestrian will exit the road crossing;

calculate a time needed for the mobile robot to cross the traffic road; and determine whether to cross the road based on:

(i) the position and movement of said particular pedestrian, and (ii) whether the robot is able to start the road crossing within a predetermined time from the detection of said particular pedestrian crossing the traffic road, and (iii) whether the mobile robot will exit the road crossing prior to or within a predetermined time interval of the pedestrian exiting the road crossing; and wherein the mobile robot start to cross the road upon a positive determination.

17. The mobile robot according to claim 16, wherein said at least one pedestrian moves with a motion pattern and wherein the processing component is further configured to analyze the pedestrian's motion pattern to determine the pedestrian's intent and to analyze the pedestrian's motion pattern to determine the pedestrian's intent to cross the traffic road at the road crossing.

18. The mobile robot according to claim 16, further configured to:

determine whether to cross the traffic road further based at least in part on output of processing of the sensor data to detect at least one pedestrian.

\* \* \* \* \*